(12) United States Patent
Abbeloos et al.

(10) Patent No.: US 12,142,023 B2
(45) Date of Patent: Nov. 12, 2024

(54) SYSTEM AND METHOD FOR GENERATING A MASK FOR OBJECT INSTANCES IN AN IMAGE

(71) Applicants: Toyota Motor Europe, Brussels (BE); Katholieke Universiteit Leuven, K.U. Leuven R&D, Leuven (BE)

(72) Inventors: Wim Abbeloos, Brussels (BE); Davy Neven, Leuven (BE); Bert De Brabandere, Leuven (BE); Marc Proesmans, Leuven (BE); Luc Van Gool, Leuven (BE)

(73) Assignees: TOYOTA MOTOR EUROPE, Brussels (BE); KATHOLIEKE UNIVERSITEIT LEUVEN, K.U. LEUVEN R&D, Leuven (BE)

( * ) Notice: Subject to any disclaimer, the term of this patent is extended or adjusted under 35 U.S.C. 154(b) by 543 days.

(21) Appl. No.: 17/423,287

(22) PCT Filed: Jan. 17, 2019

(86) PCT No.: PCT/EP2019/051191
§ 371 (c)(1),
(2) Date: Jul. 15, 2021

(87) PCT Pub. No.: WO2020/147957
PCT Pub. Date: Jul. 23, 2020

(65) Prior Publication Data
US 2022/0092869 A1 Mar. 24, 2022

(51) Int. Cl.
*G06V 10/82* (2022.01)
*G06N 3/08* (2023.01)
(Continued)

(52) U.S. Cl.
CPC .......... *G06V 10/454* (2022.01); *G06N 3/08* (2013.01); *G06V 10/762* (2022.01);
(Continued)

(58) Field of Classification Search
CPC .. G06V 10/454; G06V 10/762; G06V 10/764; G06V 10/774; G06V 10/82;
(Continued)

(56) References Cited

U.S. PATENT DOCUMENTS

2018/0336454 A1  11/2018  Lim et al.
2019/0114818 A1*  4/2019  Lin ........................ G06T 5/30

OTHER PUBLICATIONS

Jonas Uhrig et al: "Pixel-level Encoding and Depth Layering for Instance-level Semantic Labeling", arxiv.org, Cornell University Library, 201 Olin Library Cornell University Ithaca, NY 14853, Apr. 18, 2016 (Apr. 18, 2016).
(Continued)

*Primary Examiner* — Chuong A Ngo
(74) *Attorney, Agent, or Firm* — Dinsmore & Shohl LLP

(57) ABSTRACT

A system for generating a mask for object instances in an image is provided. The system includes a first module comprising a trained neural network and configured to input the image to the neural network, wherein the neural network is configured to generate: pixel offset vectors for the pixels of the object instance configured to point towards a unique center of an object instance, the pixel offset vectors thereby forming a cluster with a cluster distribution, and for each object instance an estimate of said cluster distribution defining a margin for determining which pixels belong to the object instance. A method for training a neural network map to be used for generating a mask for object instances in an image is also provided.

16 Claims, 2 Drawing Sheets

(51) Int. Cl.
*G06V 10/44* (2022.01)
*G06V 10/762* (2022.01)
*G06V 10/764* (2022.01)
*G06V 10/774* (2022.01)
*G06V 20/58* (2022.01)
*G06V 20/70* (2022.01)
*G06V 40/10* (2022.01)

(52) U.S. Cl.
CPC .......... *G06V 10/764* (2022.01); *G06V 10/774* (2022.01); *G06V 10/82* (2022.01); *G06V 20/58* (2022.01); *G06V 20/70* (2022.01); *G06V 40/10* (2022.01)

(58) Field of Classification Search
CPC ........ G06V 20/58; G06V 20/70; G06V 40/10; G06N 3/08
See application file for complete search history.

(56) References Cited

OTHER PUBLICATIONS

Bert De Brabandere et al: "Semantic Instance Segmentation with a Discriminative Loss Function", arxiv.org, Cornell University Library, 201 Olin Library Cornell University Ithaca, NY 14853, Aug. 8, 2017 (Aug. 8, 2017).

Papandreou George et al: 11 Person Lab: 1-16 Person Pose Estimation and Instance Segmentation with a Bottom-Up, Part-Based, Geometric Embedding Model 11, Computer Vision—ECCV 2018 . . . 15th European Conference, Munich, Germany, Sep. 8-14, 2018, Proceedings, Part XIV, Jan. 1, 2018 (Jan. 1, 2018), pp. 1-21.

\* cited by examiner

SYSTEM AND METHOD FOR GENERATING A MASK FOR OBJECT INSTANCES IN AN IMAGE

CROSS-REFERENCE TO RELATED APPLICATION

This application is a national phase of International Application No. PCT/EP2019/051191 filed on Jan. 17, 2019, the entire contents of which are herein incorporated by reference.

FIELD OF THE DISCLOSURE

The present disclosure is related to the field of image processing, in particular to the field of instance segmentation. More in particular, the present disclosure is related to system for generating a mask for object instances in an image.

BACKGROUND OF THE DISCLOSURE

Processing images may be used to detect various objects visible on the image. Such processing is therefore particularly useful for self-driving vehicles (partially or fully self-driving) and for other types of automated systems, because these systems have to be able to understand their surroundings on the basis of images acquired by cameras.

Instance segmentation methods have been proposed to precisely delineate objects which are visible on an image (in other words, different objects are called different instances).

The definition of semantic instance segmentation is to locate all objects in an image, assign each object to a specific class and generate a pixel-perfect mask for each one, perfectly delineating its shape. This in contrast with the standard bounding-box detection methods, where each object is represented by a crude rectangular box. Since having a binary mask for each object is desired (and necessary) in many applications, ranging from autonomous driving and robotics applications to photo-editing/analyzing applications, instance segmentation remains an important research topic.

It has been proposed to use artificial neural networks (ANNs) such as deep neural networks to perform instance segmentation. A deep neural network is a machine learning model having parameters which may be adjusted by stochastic gradient descent during a training phase to minimize the value of an objective function ("loss function"). The training phase comprises of feeding the network with labeled input-output pairs: known images with an instance segmentation which has been prepared by an operator. The specific structure and implementation of the network may be called a "network architecture".

Currently, the dominant method for instance segmentation is based on a detect-and-segment approach, where objects are detected using a bounding-box detection method and then a binary mask is generated for each one, cf. e.g.:
K. He, G. Gkioxari, P. Dollar, and R. Girshick. Mask r-cnn. In Computer Vision (ICCV), 2017 IEEE International Conference on, pages 2980-2988. IEEE, 2017, and
S. Liu, L. Qi, H. Qin, J. Shi, and J. Jia. Path aggregation network for instance segmentation. In Proceedings of the IEEE Conference on Computer Vision and Pattern Recognition, pages 8759-8768, 2018.

Although many attempts in the past, the Mask R-CNN framework was the first one to achieve outstanding results on many benchmarks, and to this date is still the most used method for instance segmentation. Their method consists of detecting objects first and generating a binary mask for each object in a next step. While this provides good results, it generates low resolution masks which are not always desirable (e.g. for photo-editing applications) and operates at a low frame rate, making it impractical for real-time applications such as autonomous driving.

Another popular branch of instance segmentation methods is based on a proposal-free methodology, mostly based on embedding loss functions or pixel affinity learning, i.e. embed-and-cluster methods: These methods are based on dense-prediction (segmentation) networks, in combination with an embedding loss function, which forces the feature vectors of pixels belonging to the same object to be similar to each other and sufficiently dissimilar from feature vectors of pixels belonging to other objects. These methods can generate instance masks at high resolution and, since they only need a single pass through the network, they have the potential to be real-time. Examples of well-performing methods are:
A. Fathi, Z. Wojna, V. Rathod, P. Wang, H. O. Song, S. Guadarrama, and K. P. Murphy. Semantic instance segmentation via deep metric learning. arXiv preprint arXiv: 1703.10277, 2017, and
B. De Brabandere, D. Neven, and L. Van Gool. Semantic instance segmentation with a discriminative loss function. arXiv preprint arXiv:1708.02551, 2017.

However, because of the spatial-invariant nature of fully-convolutional networks (FCN) they fail to deliver high accuracy.

Furthermore there are known Regression-to-center methods. These methods assign pixels to objects by learning an offset vector for each pixel, pointing to its object's center. This way, they avoid the spatial-invariance issue of FCNs. They use a standard regression loss to learn the offset vectors and rely on third-party density-based clustering algorithms to locate object centers and assign the pixels to a specific object. Since this post-processing step (center localization and clustering) is not integrated within the loss function, the network cannot be optimized end-to-end for instance segmentation, leading to inferior and slow results. Notable works include:
A. Kendall, Y. Gal, and R. Cipolla. Multi-task learning using uncertainty to weigh losses for scene geometry and semantics. arXiv preprint arXiv:1705.07115, 3, 2017, and
X. Liang, Y. Wei, X. Shen, J. Yang, L. Lin, and S. Yan. Proposal-free network for instance-level object segmentation. arXiv preprint arXiv:1509.02636, 2015.

Furthermore, instance segmentation using sem-confolutional operator is known, cf. e.g.:
Novotny, D., Albanie, S., Larlus, D., & Vedaldi, A. (2018). Semi-convolutional operators for instance segmentation. arXiv preprint arXiv:1807.10712.

SUMMARY OF THE DISCLOSURE

Currently, it remains desirable to provide a system and a method for generating a mask for object instances in an image which overcomes one or more deficiencies of the prior art, in particular for obtaining a real-time, 'proposal free' instance segmentation, e.g. for the identification of individual objects in images for computer vision applications, more specifically identification of traffic related objects such as cars, pedestrians, etc., for automotive applications.

Therefore, according to the embodiments of the present disclosure, a system for generating a mask for object instances in an image is provided (or a mask per object instance, i.e. several masks for several object instances). The system comprise a first module comprising a trained neural network and configured to input the image to the neural network, wherein the neural network is configured to generate:

pixel offset vectors for the pixels of the object instance configured to point towards a unique center of an object instance, the pixel offset vectors thereby forming a cluster with a cluster distribution, and for each object instance an estimate of said cluster distribution defining a margin for determining which pixels belong to the object instance.

By providing such a system, it becomes possible to achieve real-time instance segmentation (i.e. precisely delineating individual objects in the scene) that tackles some of the limitations of previous methods.

Advantageously the system is able to carry out a single shot method, based on a compact network structure, which only requires a single forward pass through the network (i.e. is proposal free).

As a result the system may be configured for generating a mask in real-time.

As a further result the system reaches high accuracy and outperforms slower s-o-t-a methods such as MaskRCNN.

The method is therefore a realistic component for industrial prototype or products that require real-time feedback, such as machine vision applications, or more specifically automotive applications like autonomous driving.

Furthermore the system advantageously uses a dense-prediction (encoder-decoder) network, and may hence generate masks at original input resolution.

As a further advantageous characteristic the system may have learnt (during training) "relative" embeddings (i.e. offset vectors), relative to the pixel position and has therefore no trouble with the spatial-invariant FCNs. Therefore the system is able to differentiate between similar-looking object instances appearing in the image.

Furthermore, the system desirably has learnt (during training) an optimal clustering region for each object instance and learns to point the offset-vectors into this region. Moreover, in order to locate the object instance centers, for example a seed map may indicate where the object centers are.

A unique center may be e.g. a unique point or a unique area in the image.

The neural network may be configured (i.e. trained) to generate pixel offset vectors for pixels of image background which point away from any center of any object instance in the image. Accordingly, said background image pixels vectors are not within the margin. The system may hence recognize that the background image pixels do not belong to the (or any) object instance.

The estimate of said cluster distribution may be represented by a threshold value which defines the margin for determining which pixels belong to the object instance. For example, the margin may be located around the centroid of an object instance.

The estimate of said cluster distribution may define a region within a circle or an ellipse, e.g. a circle in case of a scalar sigma and/or e.g. an ellipse in case of a 2-dimensional sigma. For example the circle or the ellipse may be located around the unique center, e.g. having an Euclidean distance.

The neural network may be trained to generate a sigma map representing pixel-wise the size of margin of an object instance, using a single valued distribution, e.g. a Gaussian distribution.

It is also possible that the neural network is trained to generate multiple sigma maps representing pixel-wise the sizes or margins of each object instance, using a multi-dimensional distribution, e.g. a Gaussian distribution.

The neural network may be configured to dynamically adjust the estimate of said cluster distribution as a function of the sigma values of the pixels of the object instance and/or of the number of pixels of the object instance.

When the sigma is not fixed (like in the discussed prior art) but a learnable parameter, the network is able to modify sigma to minimize the loss more efficiently. Aside from pulling instance pixels within the (normally small) region around the object instance centroid and pushing background pixels outside this region, it can also modify sigma such that the size of the region is more appropriate for that specific object instance. Intuitively this would mean that e.g. for a big object instance it would adapt sigma to make the region around the centroid bigger, so that more object instance pixels can point inside this region, and for small object instances to choose a smaller region, so that it is easier for background pixels to point outside the region.

The system may comprise a second module configured to assign pixels to an object instance based on the pixel offset vectors of the object instance and the estimate of said cluster distribution of the object instance.

The second module may be configured to assign pixels to an object instance by determining which pixels (being offset by their pixel offset vectors of the object instance) lie within the region defined by the estimate of said cluster distribution of the object instance.

The second module may be configured to assign pixels which are not assigned to an object instance to image background.

The trained neural network may be configured to generate a learned seed map indicating for each object instance in the image a semantic class and its center.

The second module may be further configured to locate the unique center of an estimate of a cluster distribution in the image based on the seed map.

The second module may be further configured assign a semantic class to an object instance based on the seed map.

The disclosure may further relate to a method of generating a mask for object instances in an image. The method may comprise further method steps which correspond to the functions of the system, as described above. In particular, for carrying out the method the first and/or second module may be used, as described above.

Moreover the present disclosure relates to a method for training a neural network map to be used for generating a mask for object instances in an image. The method comprises the steps of:

obtain a plurality of training images labelled each by a map indicating for each image pixel whether it belongs to an object instance or to image background, and for each training image iteratively train the neural network by:

generating pixel offset vectors for the pixels of an object instance configured to point towards a unique center of the object instance, placing a differentiable distribution function at the center of each object instance transforming the offset vectors into a probability of belonging to said object, optimizing the parameters of said distribution function such that the probability of the pixels belonging to said object instance is increased and the probability of pixels belonging to the background is decreased, and optimizing the offset vectors of the pixels of said object instance for pointing to the center of the distribution function placed at the center of said object instance.

Accordingly, once the neural network is trained by this method, it is desirably configured to be used in a system as described above.

The present disclosure further relates to a computer program including instructions for executing the steps of at least one of the methods described above, when said program is executed by a computer.

Finally, the present disclosure relates to a recording medium readable by a computer and having recorded thereon a computer program including instructions for executing the steps of at least one of the methods described above, when said program is executed by a computer.

It is intended that combinations of the above-described elements and those within the specification may be made, except where otherwise contradictory.

It is to be understood that both the foregoing general description and the following detailed description are exemplary and explanatory only and are not restrictive of the disclosure, as claimed.

The accompanying drawings, which are incorporated in and constitute a part of this specification, illustrate embodiments of the disclosure and together with the description, and serve to explain the principles thereof.

DETAILED DESCRIPTION

Reference will now be made in detail to exemplary embodiments of the disclosure, examples of which are illustrated in the accompanying drawings. Wherever possible, the same reference numbers will be used throughout the drawings to refer to the same or like parts.

Figure 1:
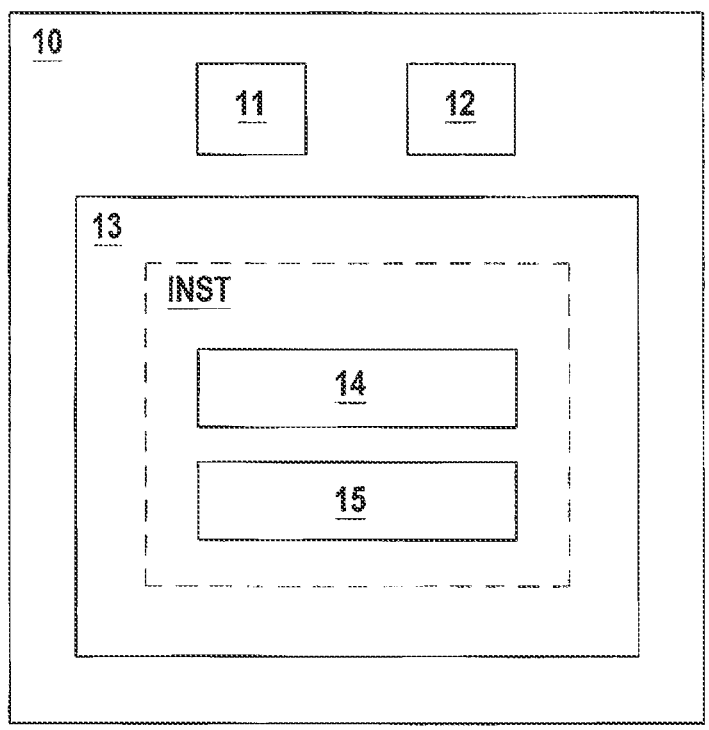
FIG. 1 shows a block diagram of a system according to embodiments of the present disclosure.

FIG. 1 shows a block diagram of a system 10 according to embodiments of the present disclosure. The steps of the method described in context of FIG. 2 can be determined by computer instructions carried out by the system 10. For example the system may comprise a processor 11 (e.g. providing together with memory 13 the first and/or the second module according to the disclosure) executing said instructions. The system 10 may further comprise an acquisition module 12 configured to acquire images (e.g. one or several cameras), and a memory 13. The memory 13 may be a non-volatile memory and it may comprise said instructions (or a computer program) INST, in particular a trained artificial neural network (ANN), which can be executed by the processor 11 to perform the method described below. The set of instructions INST (i.e. the output of the trained ANN) comprises in particular:

(14) generating pixel offset vectors for the pixels of the object instance configured to point towards a unique center of an object instance, the pixel offset vectors thereby forming a cluster with a cluster distribution, and

(15) generating for each object instance an estimate of said cluster distribution defining a margin for determining which pixels belong to the object instance.

Figure 2:
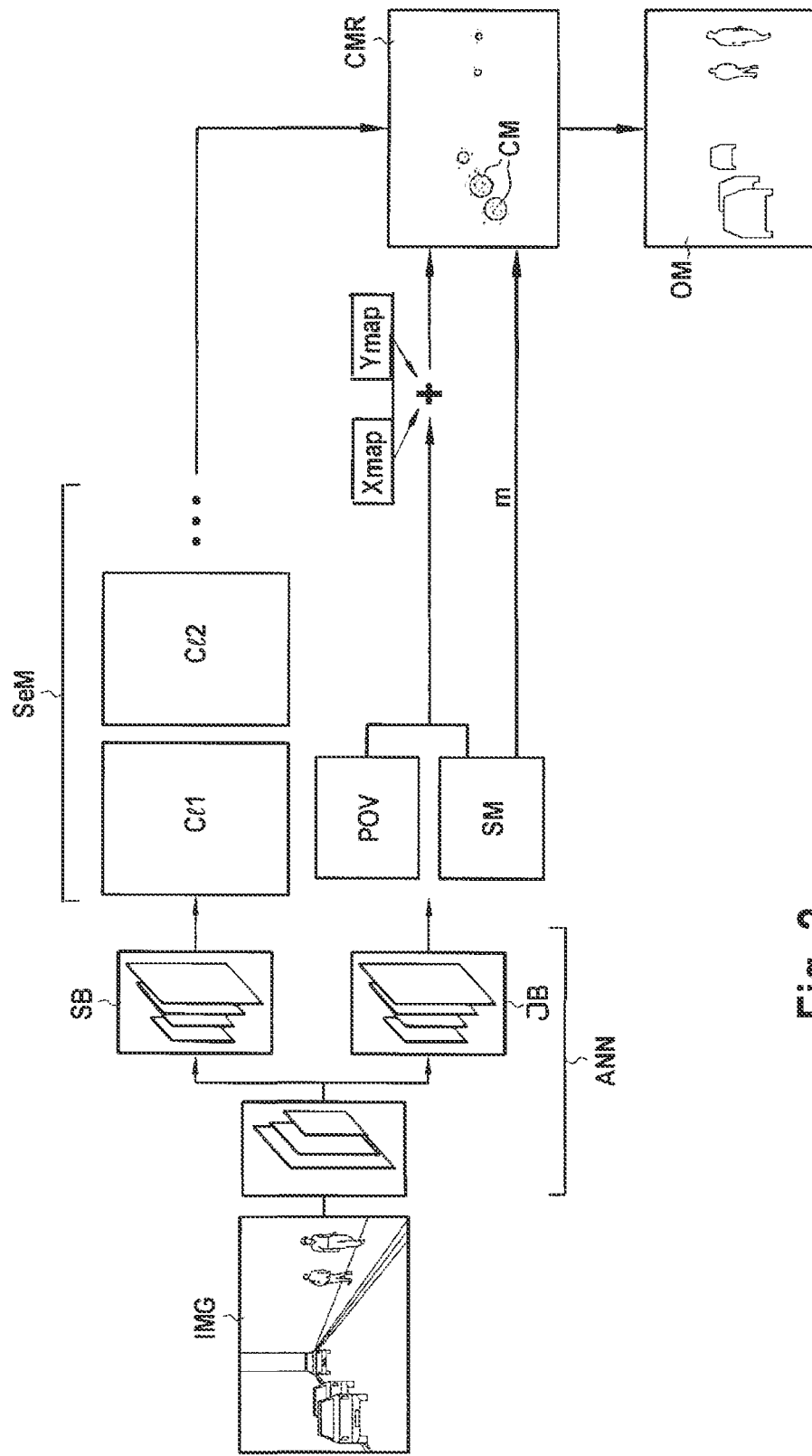
FIG. 2 shows a schematic flow chart illustrating an exemplary method of generating a mask for object instances in an image according to embodiments of the present disclosure.

FIG. 2 shows a schematic flow chart illustrating an exemplary method of generating a mask for object instances in an image according to embodiments of the present disclosure.

Generally spoken, in the method instance segmentation is treated as a pixel assignment problem, where pixels are associated with the correct objects.

To this end an offset vector is learnt for each pixel, pointing to its object's center. Unlike the standard regression approach, also an optimal clustering region is learnt for each object and by doing so the loss for pixels far away from the center is relaxed. To locate the object's centers, a seed map is learnt for each semantic class.

More in particular, in the method an image IMG is input into an artificial neural network ANN. For example, an ERFNet architecture may be used as base-network. ERFNet is a dense-prediction encoder-decoder network optimized for real-time semantic segmentation, cf.:

E. Romera, J. M. Alvarez, L. M. Bergasa, and R. Arroyo. Erfnet: Efficient residual factorized convnet for real-time semantic segmentation. IEEE Transactions on Intelligent Transportation Systems, 19(1):263-272, 2018.

In the method, the used model is converted into a 2-branch network, by sharing the encoder part and having 2 separate decoders SB (Seed Branch) and IB (Instance Branch). The first branch IB predicts the sigma and offset values, with e.g. 3 or 4 output channels depending on sigma. The other branch SB outputs N seed maps SeM, one for each semantic class CL1, CL2, etc.

In particular, the branch IB of the network predicts a sigma map SM comprising a sigma value for each pixel, which directly translates into a clustering margin (or cluster distribution) CM for each object (cf. the clustering margin representation CMR). The branch IB of the network further predicts a pixel offset map POM, i.e. an offset vector for each pixel, pointing at the center of attraction (CoA). The top branch SB predicts a seed map SeM for each semantic class Cl1, Cl2, etc. Said steps may be carried out by the first module according to the present disclosure, which comprises the ANN.

The clustering margin representation CMR unites (or consolidates) the pixel embeddings (=offset vectors+coordinate vectors xmap, ymap) and margins m calculated from the predicted sigma. The cluster centers are derived from the seed maps. The object mask or masks OM (e.g one mask per object instance) may then be generated by assigning pixels to an object instance by determining which pixels (being offset by their pixel offset vectors of the object instance) lie within the region defined by the clustering margin CM. Furthermore, pixels which are not assigned to an object instance may be assigned to image background. Said steps may be carried out by the second module according to the present disclosure. Said steps may e.g. be carried out without using an ANN (but e.g. as (hard-coded) computer instructions), in particular beyond (i.e. after) the ANN of the first module.

The method is described in further detail in the following. Generally, the goal of instance segmentation is to cluster a set of pixels X with a 2-dimensional coordinate vector, into a set of instances S.

An often used method is to assign pixels to its corresponding instance centroid $$C_k = \frac{1}{N}\sum\nolimits_{x\in S_k} x$$

This is achieved by learning an offset vector of for each pixel xi, so that the resulting (spatial) embedding ei=xi+oi points to its corresponding instance centroid. Typically, the offset vectors are learned using a regression loss function with strong supervision:

$$\mathcal{L}_{regr} = \sum_{i=1}^{n} \|o_i - \hat{o}_i\| \quad (1)$$

where $\hat{o}_i = C_k - x_i$ for $x_i \in S_k$.

However, the above method poses two issues at inference time. First, the locations of the instance centroids have to be determined and second, the pixels have to be assigned to a specific instance centroid. To solve these problems, previous methods rely on density-based clustering algorithms to first locate a set of centroids and next assign pixels to a specific instance based on a minimum distance-to-centroid metric:

$$e_i \in S_k : k = \underset{C}{\arg\min} \|e_i - C\| \quad (2)$$

Since this post-processing step (center localization and clustering) is not integrated within the loss function, the network cannot be optimized end-to-end for instance segmentation, leading to inferior results.

Learnable Margin:

The assignment of pixels to instance centroids can be incorporated into the loss function by replacing the standard regression loss with a hinge loss variant, forcing pixels to lay within a specified margin δ (the hinge margin) around the instance centroid:

$$\mathcal{L}_{hinge} = \sum_{i=1}^{k} \sum_{e \in S_i} \lfloor \|e - C_i\| - \delta \rfloor_+ \quad (3)$$

with $\lfloor x \rfloor_+ = \max(x, 0)$.

This way, at test time, pixels are assigned to a centroid by clustering around the centroid with this fixed margin:

$$e_i \in S_k \Leftrightarrow \|e_i - C_k\| < \delta \quad (4)$$

However, a downside to this method is that the margin δ has to be selected based on the smallest object, ensuring that if two small objects are next to each other, they can still be clustered into two different instances. If a dataset contains both small and big objects, this constraint negatively influences the accuracy of big objects, since pixels far away from the centroid will not be able to point into this small region around the centroid. Although using a hinge loss incorporates the clustering into the loss function, given the said downside it is not usable in practice.

To solve this issue it is proposed according to the present disclosure to learn an instance specific margin. For small instances a small margin should be used, while for bigger objects, a bigger margin would be preferred. This way, the loss is relaxed for pixels further away from the instance centroid, as they are no longer forced to point exactly at the instance centroid.

In order to do so, it is proposed to use a Gaussian Mapping Function φk for each instance Sk, which converts the distance between a (spatial) pixel embedding ei=xi+oi and the instance centroid Ck into a probability of belonging to that instance:

$$\phi_k(e_i) = \exp\left(-\frac{\|e_i - C_k\|^2}{2\sigma_k^2}\right) \quad (5)$$

A high probability means that the pixel embedding ei is close to the instance centroid and is likely to belong to that instance, while a low probability means that the pixel is more likely to belong to the background (or another instance). More specifically, if e.g. φk (ei)>0.5, than that pixel, at location xi, may be assigned to instance k.

In short, the margin for each instance may be defined by the learnable sigma parameter in a gaussian mapping function.

Thus, by modifying the sigma parameter of the mapping function, the margin can be controlled:

$$\mathrm{margin} \sqrt{-2\sigma^2 \ln 0.5} \quad (6)$$

A large sigma will result in a bigger margin, while a small sigma will result in a smaller margin. The network outputs a σi at each pixel location. The sigma of instance k, σk, may be formulated as the average over all σi belonging to instance k:

$$\sigma_k = \frac{1}{N} \sum_{\sigma_i \in S_k} \sigma_i \quad (7)$$

Since for each instance k the gaussian mapping function outputs a foreground/background probability map, this can be optimized by using a binary classification loss. As loss function e.g. the Lovasz-hinge loss may be used (cf. J. Yu and M. Blaschko. Learning submodular losses with the lovasz hinge. In International Conference on Machine Learning, pages 1623-1631, 2015), i.e. a loss for binary segmentation which optimizes the intersection over union, and operates on the probabilities coming out of the Gaussian mapping function and uses the binary foreground/background maps of each instance as ground-truth.

Note that the sigma and offset vector outputs of the network are optimized to maximize the intersection over union of each instance mask, and only receive gradients by backpropagation through the lovasz-hinge loss function and through the gaussian mapping function.

Intuition:

It may be considered e.g. the case where the sigma (margin) of the Gaussian mapping function is kept fixed. In contrast with the standard regression loss explained above, in the method according to the present disclosure there is no explicit loss term pulling instance pixels to the instance centroid. Instead, by minimizing the binary loss, instance pixels are now indirectly forced to lay within the region around the instance centroid and background pixels are forced to point outside this region.

When the sigma is not fixed but a learnable parameter, the network can now also modify sigma to minimize the loss more efficiently. Aside from pulling instance pixels within the (normally small) region around the instance centroid and pushing background pixels outside this region, it can now also modify sigma such that the size of the region is more appropriate for that specific instance. Intuitively this would mean that e.g. for a big object it would adapt sigma to make the region around the centroid bigger, so that more instance pixels can point inside this region, and for small objects to choose a smaller region, so that it is easier for background pixels to point outside the region.

Loss Extensions:

In the above formulation of the gaussian mapping function a scalar value is used for sigma. This will result in a circular margin. However, the mapping function may also be modified to use e.g. a 2-dimensional sigma:

$$\phi_k(e_i) = \exp\left(-\frac{(e_{ix} - C_x)^2}{2\sigma_x^2} - \frac{(e_{iy} - C_y)^2}{2\sigma_y^2}\right) \quad (8)$$

By doing so, the network has the possibility of also learning an elliptical margin, which may be better suited for rectangular objects. Note that in this case the network has to output two sigma maps, one for σx and one for σy.

In other words, the sigma may either be a scalar (σ), which results in a circular margin, or a two-dimensional vector ($\sigma_{xy}$), resulting in an elliptical margin. For example, for rectangular objects (e.g. pedestrians) a circular margin is not optimal, since it can only expand until it reaches the shortest border. An elliptical margin however would have the possibility to stretch and adapt to the shape of an object, possibly resulting in a higher accuracy.

Another modification may be made on the center of the gaussian mapping function. As default the Gaussian may be placed in the centroid Ck of each instance. By doing so, pixel embeddings are pulled towards the instance centroid.

However, it may also be possible to let the network learn a more optimal center of attraction (CoA). This may be done e.g. by defining the center as the mean over the embeddings of instance k. This way, the network can influence the location of the center of attraction by changing the location of the embeddings:

$$\phi_k(e_i) = \exp\left(-\frac{\left\|e_i - \frac{1}{N}\sum_{e_i \in S_k} e_i\right\|^2}{2\sigma_k^2}\right) \quad (9)$$

In other words, the center of attraction (CoA) of an instance may be defined as either the centroid, or more general, as a learnable center calculated by taking the mean over all spatial embeddings belonging to the instance. Intuitively, by giving the network the opportunity to decide on the location of the CoA itself, it can learn a more optimal location than the standard centroid.

Seed Map:

At inference time the method clusters around the center of each object. Since the above loss function forces pixel embeddings to lay close to the object's center, the method may sample a good pixel embedding and use that location as instance center. Therefore, for each pixel embedding the neural network has learnt how far it is removed from the instance center. Pixel embeddings who lay very close to their instance center will get a high score in the seed map, pixel embeddings which are far away from the instance center will get a low score in the seed map. This way, at inference time, a pixel embedding can be selected with a high seed score, indicating that that embedding will be very close to an object's center.

In fact, the seediness score of a pixel embedding should be equal the output of the gaussian mapping function, since it converts the distance between an embedding and the instance center into a closeness score. The closer the embedding is laying to the center, the closer the output will be to 1.

Therefore, we train the seed map with a regression loss function. Background pixels are regressed to zero and foreground pixels are regressed to the output of the Gaussian mapping function. A seed map may be trained for each semantic class, with the following loss function:

$$\mathcal{L}_{seed} = \frac{1}{N}\sum_i^N \mathbb{1}_{\{s_i \in S_k\}}\|s_i - \phi_k(e_i)\|^2 + \mathbb{1}_{\{s_i \in bg\}}\|s_i - 0\|^2 \quad (10)$$

with si the network's seed output of pixel i. Note that this time φk(ei) may be considered to be a scalar: gradients are only calculated for si.

Postprocessing:

At inference time, a sequential clustering approach may be followed for each class-specific seed map. The pixels in the seed map with the highest value indicate which embeddings lay closest to an object's center. The procedure is to sample the embedding ê with the highest seed value and use that location as instance center Ĉ. At the same location, also a sigma value, σ̂ may be sampled. By using this center and accompanying sigma σ̂, the pixel embeddings are clustered into instance S:

$$e_i \in S \Leftrightarrow \exp\left(-\frac{\|e_i - \hat{C}\|^2}{2\hat{\sigma}^2}\right) > 0.5 \quad (11)$$

Next all clustered pixels may be masked out in the seed map and sampling is continue until all seeds are masked. This process may be repeated for all classes.

Throughout the description, including the claims, the term "comprising a" should be understood as being synonymous with "comprising at least one" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially" and/or "approximately" and/or "generally" should be understood to mean falling within such accepted tolerances.

Although the present disclosure herein has been described with reference to particular embodiments, it is to be understood that these embodiments are merely illustrative of the principles and applications of the present disclosure.

It is intended that the specification and examples be considered as exemplary only, with a true scope of the disclosure being indicated by the following claims.

The invention claimed is:

1. A system for generating a mask for object instances in an image, comprising:
a first module comprising a trained neural network and configured to input the image to the neural network, wherein the neural network is configured to generate:
pixel offset vectors for the pixels of the object instance configured to point towards a unique center of an object instance, the pixel offset vectors thereby forming a cluster with a cluster distribution, and for each object instance an estimate of said cluster distribution defining a margin for determining which pixels belong to the object instance.

2. The system according to the claim 1, wherein the neural network is configured to generate:

pixel offset vectors for pixels of image background which point away from any center of any object instance in the image.

3. The system according to claim 1, wherein the estimate of said cluster distribution is represented by a threshold value which defines the margin for determining which pixels belong to the object instance, in particular being located around the centroid of an object instance.

4. The system according to claim 1, wherein the estimate of said cluster distribution defines a region within a circle or an ellipse, in particular a circle in case of a scalar sigma and an ellipse in case of a 2-dimensional sigma, more in particular the circle or the ellipse being located around the unique center, more in particular having an Euclidean distance.

5. The system according to claim 1, wherein the neural network is trained to generate a sigma map representing pixel-wise a size of margin of an object instance, using a single valued distribution, in particular a Gaussian distribution.

6. The system according to claim 1, wherein the neural network is trained to generate multiple sigma maps representing pixel-wise the sizes or margins of each object instance, using a multi-dimensional distribution, in particular a Gaussian distribution.

7. The system according to claim 1, wherein the neural network is configured to dynamically adjust the estimate of said cluster distribution as a function of one or more of sigma values of the pixels of the object instance and a number of pixels of the object instance.

8. The system according to claim 1, wherein the system comprises a second module configured to assign pixels to an object instance based on the pixel offset vectors of the object instance and the estimate of said cluster distribution of the object instance.

9. The system according to claim 8, wherein the second module is configured to assign pixels to an object instance by determining which pixels offset by their pixel offset vectors of the object instance lie within a region defined by the estimate of said cluster distribution of the object instance.

10. The system according to claim 8, wherein the second module is configured to assign pixels which are not assigned to an object instance to image background.

11. The system according to claim 8, wherein the second module is further configured to locate the unique center of an estimate of a cluster distribution in the image based on the seed map.

12. The system according to claim 8, wherein the second module is further configured to assign a semantic class to an object instance based on the seed map.

13. The system according to claim 1, wherein the trained neural network is configured to generate a learned seed map indicating for each object instance in the image a semantic class and its center.

14. The system according to claim 1, wherein the neural network is trained to be used for generating the mask for object instances in the image by a method comprising:

obtaining a plurality of training images each labelled by a map indicating for each image pixel whether it belongs to the object instance or to an image background, and iteratively training the neural network for each training image by:

generating the pixel offset vectors for the pixels of the object instance configured to point towards the unique center of the object instance, placing a differentiable distribution function at the center of each object instance transforming the offset vectors into a probability of belonging to said object, optimizing parameters of said distribution function such that the probability of the pixels belonging to said object instance is increased and the probability of pixels belonging to the background is decreased, and optimizing the offset vectors of the pixels of said object instance for pointing to the center of the distribution function placed at the center of said object instance.

15. A method for training a neural network map to be used for generating a mask for object instances in an image, the method comprising:

obtaining a plurality of training images each labelled by a map indicating for each image pixel whether it belongs to an object instance or to image background, and iteratively training the neural network for each training image by:

generating pixel offset vectors for the pixels of an object instance configured to point towards a unique center of the object instance, placing a differentiable distribution function at the center of each object instance transforming the offset vectors into a probability of belonging to said object, optimizing parameters of said distribution function such that the probability of the pixels belonging to said object instance is increased and the probability of pixels belonging to the background is decreased, and optimizing the offset vectors of the pixels of said object instance for pointing to the center of the distribution function placed at the center of said object instance.

16. A non-transitory recording medium readable by a computer and having recorded thereon a computer program including instructions for executing the steps of a method according to claim 15 when said program is executed by a computer.

* * * * *

UNITED STATES PATENT AND TRADEMARK OFFICE
CERTIFICATE OF CORRECTION

PATENT NO. : 12,142,023 B2  
APPLICATION NO. : 17/423287  
DATED : November 12, 2024  
INVENTOR(S) : Abbeloos et al.

Page 1 of 1

It is certified that error appears in the above-identified patent and that said Letters Patent is hereby corrected as shown below:

On the Title Page

Item (73) Assignee, Please change "Toyota Motor Europe and Katholieke Universiteit Leuven, K.U. Leuven R&D" to --Toyota Jidosha Kabushiki Kaisha--.

Signed and Sealed this  
Sixth Day of May, 2025

Coke Morgan Stewart  
*Acting Director of the United States Patent and Trademark Office*